United States Patent
Li

(10) Patent No.: US 10,735,311 B2
(45) Date of Patent: Aug. 4, 2020

(54) METHOD FOR OBTAINING INFORMATION ABOUT SERVICE CHAIN IN CLOUD COMPUTING SYSTEM AND APPARATUS

(71) Applicant: Huawei Technologies Co., Ltd., Shenzhen, Guangdong (CN)

(72) Inventor: Shitao Li, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 200 days.

(21) Appl. No.: 15/920,268

(22) Filed: Mar. 13, 2018

(65) Prior Publication Data
US 2018/0205637 A1    Jul. 19, 2018

Related U.S. Application Data

(63) Continuation of application No. PCT/CN2016/089926, filed on Jul. 13, 2016.

(30) Foreign Application Priority Data

Sep. 14, 2015   (CN) .......................... 2015 1 0583291

(51) Int. Cl.
*H04L 12/707* (2013.01)
*G06F 9/455* (2018.01)
(Continued)

(52) U.S. Cl.
CPC .......... *H04L 45/24* (2013.01); *G06F 9/45558* (2013.01); *H04L 29/08* (2013.01);
(Continued)

(58) Field of Classification Search
CPC ... H04L 45/24; H04L 41/5058; H04L 67/147; H04L 67/141; H04L 41/0893;
(Continued)

(56) References Cited

U.S. PATENT DOCUMENTS 7,907,595 B2    3/2011 Khanna et al.
2015/0092567 A1*    4/2015 Majd ................... H04L 12/2856
370/242

(Continued)

FOREIGN PATENT DOCUMENTS

CN       101166137 A     4/2008
CN       103200089 A     7/2013
(Continued)

OTHER PUBLICATIONS

"Network Functions Virtualisation (NFV): Virtual Network—Functions Architecture", Group Specification, European Telecommunications Standards Institute (ETSI), ETSI GS NFV-SWA 001 v1.1.1. Dec. 1, 2012, 93 pages, XP014235735.

*Primary Examiner* — Soe Hlaing
(74) *Attorney, Agent, or Firm* — Leydig, Voit & Mayer, Ltd.

(57) ABSTRACT

The present disclosure provides a method for obtaining information about a service chain in a cloud computing system and an apparatus. In the method, a service control proxy apparatus may interact with a service chain decision network element to receive a path forwarding identifier that is of a path used to transmit data of a service in a mobile network and that is sent by the service chain decision device; interact with an NFVO to obtain an address of a virtual controller; then interact with the virtual controller to obtain information about a physical service chain from the virtual controller; and send the information about the physical service chain to the service chain decision device. In this way, the service data can be routed according to the information about the service chain of the service data.

12 Claims, 5 Drawing Sheets

(51) Int. Cl.
*H04L 12/741* (2013.01)
*H04L 29/08* (2006.01)
*H04L 12/24* (2006.01)

(52) U.S. Cl.
CPC ...... *H04L 41/0893* (2013.01); *H04L 41/5058* (2013.01); *H04L 45/74* (2013.01); *H04L 67/10* (2013.01); *H04L 67/141* (2013.01); *H04L 67/147* (2013.01); *G06F 2009/45595* (2013.01)

(58) Field of Classification Search
CPC ......... H04L 29/08; H04L 67/10; H04L 45/74; G06F 9/45558; G06F 2009/45595
See application file for complete search history.

(56) References Cited

U.S. PATENT DOCUMENTS

| | | |
|---|---|---|
| 2016/0028621 A1 | 1/2016 | Gao |
| 2016/0134472 A1 | 5/2016 | Guan et al. |
| 2017/0300352 A1 | 10/2017 | Lou et al. |

FOREIGN PATENT DOCUMENTS

| | | |
|---|---|---|
| CN | 103491129 A | 1/2014 |
| CN | 103581336 A | 2/2014 |
| CN | 104636184 A | 5/2015 |
| EP | 2854347 A2 | 4/2015 |

\* cited by examiner

METHOD FOR OBTAINING INFORMATION ABOUT SERVICE CHAIN IN CLOUD COMPUTING SYSTEM AND APPARATUS

CROSS-REFERENCE TO RELATED APPLICATIONS

This application is a continuation of International Application No. PCT/CN2016/089926, filed on Jul. 13, 2016, which claims priority to Chinese Patent Application No. 201510583291.6, filed on Sep. 14, 2015. The disclosures of the aforementioned applications are hereby incorporated by reference in their entireties.

TECHNICAL FIELD

The present application relates to cloud computing technologies, and in particular, to a method for obtaining information about a service chain in a cloud computing system and an apparatus.

BACKGROUND

In network functions virtualization (NFV), a general-purpose hardware device and a virtualization technology are used to fulfill a function of a dedicated device in a conventional network, so as to reduce high deployment costs of the dedicated device. Software is not bound to dedicated hardware, so that a function of a network device no longer depends on the dedicated hardware. In addition, cloud computing is used, so that resources can be shared fully and flexibly, new services can be rapidly developed and deployed, and automatic deployment, auto scaling, fault isolation, fault self-recovery, and the like can be implemented based on an actual service requirement. In an NFV architecture, a party that receives an instantiation request and performs instantiation processing on a corresponding service (deploys the service) according to the request is referred to as a virtualization service provider (service provider for short), and a party that initiates the instantiation request is referred to as a service requester.

A virtualized network service (NS) in NFV may be, for example, an IP multimedia subsystem (IMS) network service, or an evolved packet core (EPC) service. One NS may include several virtualized network function (VNF) modules, which are also referred to as virtualized network elements. A VNF is a software implementation of a network function that may be deployed in an NFV infrastructure. During virtualization deployment of an NS, a service requester first needs to submit network service descriptor (NSD) to a service provider. The NSD mainly describes a topology of the network service and descriptor of included VNFs (VNF descriptor, VNFD). In addition, the service requester further needs to submit information about forwarding paths of the service among the VNFs (VNF forwarding graph, VNFFG) to the service provider.

For path allocation to a data flow of a mobile network in the prior art, refer to a diagram of a network architecture shown in FIG. 1. A PCRF 102 learns a current network status of a subscriber according to subscription data of the subscriber in a subscriber database 101 by using a gateway 103, selects a logical service chain, and sends an identifier of the selected logical service chain to a traffic controller 104. The traffic controller 104 sends a request to a service controller 106 according to the identifier of the selected logical service chain, to obtain an identifier of a physical service chain. After receiving the request of the traffic controller 104, the service controller 106 obtains, from a service manager 105, information about the logical service chain corresponding to the identifier of the logical service chain, and allocates actual physical network elements 108 according to the returned information about the logical service chain.

For example, information about a logical service chain corresponding to a path forwarding identifier: video optimization sequentially includes a TCP proxy, a video cache, and a NAT. The TCP proxy selected by the service controller is a physical network element whose IP address is 10.10.1.1. The video cache selected by the service controller is a physical network element whose IP address is 10.10.2.2. The NAT selected by the service controller is a physical network element whose IP address is 10.10.4.4. In addition, the service controller generates information about a physical service chain, allocates an identifier of the physical service chain to the physical service chain, generates a routing and forwarding table by using the IP addresses of the allocated actual physical devices and the identifier of the physical service chain, and sends the generated routing and forwarding table to a corresponding router for configuration by the router. The routing and forwarding table is shown in Table 1.

TABLE 1

| Physical service chain identifier | Rank | Next-hop address |
|---|---|---|
| 10 | 3 | 10.10.1.1 |
| 10 | 2 | 10.10.2.2 |
| 10 | 1 | 10.10.4.4 |

In addition, the service controller further sends the generated routing and forwarding table to the traffic controller. Therefore, after receiving data, the traffic controller adds the identifier of the physical service chain and a sequence in the physical service chain to the data, and sends the data to the router. The router determines a route according to the stored routing and forwarding table and the identifier of the physical service chain and the sequence in the physical service chain that are added to the data.

It can be learned from above that, a traffic controller applies to a service controller for a configuration requirement of a physical service chain of a service in an existing mobile network. In the existing mobile network, a service controller that interacts with a traffic controller is configured in advance for the traffic controller. However, based on an existing cloud computing system, for example, in an NFV architecture, a policy and charging rules function (PCRF), a gateway (GW), a traffic controller, and another network element device all run on virtualized network elements, that is, VNFs. The VNFs all run in virtual machines, and a network functions virtualization infrastructure (NFVI) provides virtual resources. The virtual resources provided to the VNFs by the NFVI include a virtual computing resource, a virtual storage resource, a virtual network resource, and the like. The virtual network resource includes a virtual network connection provided by a virtual switch (vSwitch) and route control provided by a service controller (for example, an SDN controller). However, in the existing NFV architecture, the VNF virtualized network elements are all managed by a virtual switch and communicate with the virtual switch. A software-defined networking (SDN) controller manages multiple virtual switches. In addition, in an NFV-based architecture, a virtual switch and a virtual controller for managing a VNF network element are not permanently configured for the VNF network element.

Therefore, a service chain cannot be allocated to a service in a mobile network in the existing NFV architecture. Consequently, a network element for implementing the service in the mobile network cannot obtain information about a service chain for transmitting service data, and therefore, the service data cannot be routed.

SUMMARY

The present disclosure provides a method for obtaining information about a service chain in a cloud computing system and an apparatus, so as to resolve a prior-art problem that a service chain cannot be allocated to a service in a mobile network in an existing NFV architecture, and therefore, service data cannot be routed.

According to an aspect, an embodiment of the present disclosure provides a method for obtaining information about a service chain in a cloud computing system. The method is performed by a service control proxy apparatus added to an NFV system, and the service control proxy apparatus implements interaction with a service chain decision device and a virtual controller. For example, after receiving a path forwarding identifier that is of a path used to transmit service data and that is sent by the service chain decision device, the service control proxy apparatus interacts with an NFVO to obtain information that is about a path instance and that corresponds to the path forwarding identifier. The information about the path instance includes an identifier of the path instance, an address of each node in the path, and a rank of each node in the path. The service control proxy apparatus obtains, according to the obtained identifier of the path instance, an address that is of the virtual controller and that corresponds to the identifier of the path instance, and obtains an identifier of a physical service chain from the virtual controller according to the address of the virtual controller, the address of each node in the path, and the rank of each node in the path. Then, the service control proxy apparatus sends information about the physical service chain to the service chain decision device.

In a possible design, the service control proxy apparatus sends a path instance allocation request message to the network functions virtualization orchestrator NFVO, and receives the information that is about the path instance selected by the NFVO according to the path forwarding identifier and that is returned by the NFVO.

In another possible design, when receiving the information that is about the path instance and that is returned by the NFVO, the service control proxy apparatus also receives information that is about a virtualized infrastructure manager VIM managing the path instance and that is sent by the NFVO. The service control proxy apparatus sends, to the NFVO, a request that is for obtaining an address of a virtual controller and that includes the identifier of the path instance and the information about the VIM, so that the NFVO obtains, from the VIM according to the information about the VIM, the address that is of the virtual controller and that corresponds to the identifier of the path instance.

In another possible design, when receiving the information that is about the path instance and that is returned by the NFVO, the service control proxy apparatus also receives information that is about a virtualized infrastructure manager VIM managing the path instance and that is sent by the NFVO. The service control proxy apparatus sends, to the NFVO, a request that is for obtaining an address of a virtual controller and that includes the address of each node in the path, the rank of each node in the path, and the information about the VIM, so that the NFVO obtains, from the VIM according to the information about the VIM, the address that is of the virtual controller and that corresponds to the identifier of the path instance, where the identifier of the path instance corresponds to the address of each node in the path and the rank of each node in the path.

In another possible design, the service control proxy apparatus sends, to the NFVO, a request that is for obtaining an address of a virtual controller and that includes the identifier of the path instance, so that the NFVO obtains, according to the identifier of the path instance, information about a VIM managing the path instance, and obtains, from the VIM, the address that is of the virtual controller and that corresponds to the identifier of the path instance.

In another possible design, the service control proxy apparatus sends, to the NFVO, a request that is for obtaining an address of a virtual controller and that includes the address of each node in the path and the rank of each node in the path, so that the NFVO obtains, according to the address of each node in the path and the rank of each node in the path, information about a VIM managing the path instance, and obtains, from the VIM, the address that is of the virtual controller and that corresponds to the identifier of the path instance, where the identifier of the path instance corresponds to the address of each node in the path and the rank of each node in the path.

In another possible design, the service control proxy apparatus sends, to the virtual controller according to the address of the virtual controller, a physical service chain identifier obtaining request that carries the address of each node in the path and the rank of each node in the path, so that the virtual controller generates an identifier of a physical service chain according to the address of each node in the path and the rank of each node in the path, and returns the identifier of the physical service chain to the service control proxy apparatus.

According to another aspect, an embodiment of the present disclosure provides a processing method of an NFVO in a process of obtaining information about a service chain. Specifically, after receiving a path instance allocation request message that is sent by a service control proxy apparatus and that includes a path forwarding identifier, the NFVO selects a path instance according to the path forwarding identifier, and returns, to the service control proxy apparatus, information that is about the path instance and that includes an identifier that is of the path instance and that corresponds to the path forwarding identifier, an address of each node in the path, and a rank of each node in the path. Then, the NFVO obtains an address of a virtual controller from a VIM according to a request that is for obtaining an address of a virtual controller, that is sent by the service control proxy apparatus, and that includes the identifier of the path instance, or according to an address obtaining request that carries the address of each node in the path and the rank of each node in the path, and provides the address of the virtual controller to the service control proxy apparatus, so that the service control proxy apparatus can obtain, from the virtual controller according to the address of the virtual controller, an identifier that is of a physical service chain and that is generated by the virtual controller according to the address of each node in the path and the rank of each node in the path.

In a possible design, when sending the information about the path instance, the NFVO may also send information about the VIM managing the path instance to the service control proxy apparatus, where the request that is for obtaining an address of a virtual controller and that is received by the NFVO further carries the information about the VIM managing the path instance. The NFVO directly sends the request for obtaining an address of a virtual controller to the VIM according to the information about the VIM.

In a possible design, if the request for obtaining an address of a virtual controller does not include information about the VIM managing the path instance, the NFVO further obtains, according to the identifier that is of the path instance and that is included in the request for obtaining an address of a virtual controller, the information about the VIM managing the selected path instance, and sends, according to the obtained information about the VIM, the request for obtaining an address of a virtual controller to the VIM managing the path instance.

In a possible design, the NFVO further receives a service chain decision device instantiation request that carries an identifier of a VNF descriptor VNFD of a service chain decision device, obtains the VNFD according to the identifier of the VNFD, then determines, according to the VNFD, that the VNFD includes a requirement for a service control proxy apparatus, and then sends the service chain decision device instantiation request to a selected VNFM that includes a service control proxy apparatus.

In a possible design, the NFVO further receives a service chain decision device instantiation request that carries an identifier of a VNF descriptor VNFD of a service chain decision device, obtains the VNFD according to the identifier of the VNFD, then determines, according to the VNFD, that the VNFD includes a requirement for a service control proxy apparatus, then selects, for the service chain decision device, a service control proxy apparatus and a VNFM that does not include a service control proxy apparatus, and sends the service chain decision device instantiation request to the selected VNFM that does not include a service control proxy apparatus. An identifier of the selected service control proxy apparatus is used to instruct the VNFM to configure, after the service chain decision device is instantiated, an address of the service control proxy apparatus for an instance of the service chain decision device according to the identifier of the service control proxy apparatus.

According to another aspect, an embodiment of the present disclosure provides a service control proxy apparatus, including a receiving unit, an obtaining unit, and a sending unit. The receiving unit is configured to receive a path forwarding identifier that is of a path used to transmit service data and that is sent by a service chain decision device. The obtaining unit is configured to: obtain information that is about a path instance and that corresponds to the path forwarding identifier, where the information about the path instance includes an identifier of the path instance, an address of each node in the path, and a rank of each node in the path; obtain an address that is of a virtual controller and that corresponds to the identifier of the path instance; and obtain an identifier of a physical service chain from the virtual controller according to the address of the virtual controller, the address of each node in the path, and the rank of each node in the path. The sending unit is configured to send information about the physical service chain to the service chain decision device, where the information about the physical service chain includes the identifier of the physical service chain, the address of each node in the path, and the rank of each node in the path, and the information about the physical service chain is used to instruct to route and forward the service data.

According to another aspect, an embodiment of the present disclosure provides a network functions virtualization orchestrator NFVO, including a receiving unit and a sending unit. The receiving unit is configured to receive a path instance allocation request message that is sent by a service control proxy apparatus, where the path instance allocation request message carries the path forwarding identifier. The sending unit is configured to return information about a path instance to the service control proxy apparatus, where the information about the path instance includes an identifier that is of the path instance and that corresponds to the path forwarding identifier, an address of each node in the path, and a rank of each node in the path. In addition, the receiving unit is further configured to receive a request that is for obtaining an address of a virtual controller and that is sent by the service control proxy apparatus, where the request for obtaining an address of a virtual controller carries the identifier of the path instance. The sending unit is further configured to send the request for obtaining an address of a virtual controller to a virtualized infrastructure manager VIM managing the path instance indicated by the identifier of the path instance. Further, the receiving unit is configured to receive an address of a virtual controller that is returned by the VIM. The sending unit is further configured to send the address of the virtual controller to the service control proxy apparatus, where the address of the virtual controller is used to indicate the virtual controller that provides an identifier of a physical service chain according to the address of each node in the path and the rank of each node in the path.

According to another aspect, an embodiment of the present disclosure provides a network element, including: a memory, configured to store computer executable program code; a transceiver; and a processor, coupled to the memory and the transceiver.

The program code includes an instruction. When the processor executes the instruction, the instruction enables the network element to perform the following operations: receiving a path forwarding identifier that is of a path used to transmit service data and that is sent by a service chain decision device; obtaining information that is about a path instance and that corresponds to the path forwarding identifier, where the information about the path instance includes an identifier of the path instance, an address of each node in the path, and a rank of each node in the path; obtaining an address that is of a virtual controller and that corresponds to the identifier of the path instance; obtaining an identifier of a physical service chain from the virtual controller according to the address of the virtual controller, the address of each node in the path, and the rank of each node in the path; and sending information about the physical service chain to the service chain decision device, where the information about the physical service chain includes the identifier of the physical service chain, the address of each node in the path, and the rank of each node in the path, and the information about the physical service chain is used to instruct to route and forward the service data.

According to another aspect, an embodiment of the present disclosure provides a network element, including: a memory, configured to store computer executable program code; a transceiver; and a processor, coupled to the memory and the transceiver.

The program code includes an instruction. When the processor executes the instruction, the instruction enables the network element to perform the following operations: receiving a path instance allocation request message that is sent by a service control proxy apparatus, where the path instance allocation request message carries the path forwarding identifier; returning information about a path instance to the service control proxy apparatus, where the information about the path instance includes an identifier that is of the path instance and that corresponds to the path forwarding identifier, an address of each node in the path, and a rank of each node in the path; receiving a request that is for obtaining an address of a virtual controller and that is sent by the service control proxy apparatus, where the request for obtaining an address of a virtual controller carries the identifier of the path instance; sending the request for obtaining an address of a virtual controller to a virtualized infrastructure manager VIM managing the path instance indicated by the identifier of the path instance; receiving an address of a virtual controller that is returned by the VIM; and sending the address of the virtual controller to the service control proxy apparatus, where the address of the virtual controller is used to indicate the virtual controller that provides an identifier of a physical service chain according to the address of each node in the path and the rank of each node in the path.

According to still another aspect, an embodiment of the present disclosure provides a computer storage medium, configured to store a computer software instruction used by the foregoing service control proxy apparatus, where the computer software instruction includes a program designed for executing the foregoing aspect.

According to yet another aspect, an embodiment of the present disclosure provides a computer storage medium, configured to store a computer software instruction used by the foregoing NFVO, where the computer software instruction includes a program designed for executing the foregoing aspect.

It can be learned from the foregoing solutions that, in the embodiments of the present disclosure, a service control proxy apparatus may interact with a service chain decision network element to receive a path forwarding identifier that is of a path used to transmit data of a service in a mobile network and that is sent by the service chain decision device; interact with an NFVO to obtain an address of a virtual controller; then interact with the virtual controller to obtain information about a physical service chain from the virtual controller; and send the information about the physical service chain to the service chain decision device. In this way, in a cloud computing system, information about a service chain is provided to implement transmission of service data of a service in a mobile network, so that the service data can be routed according to the information about the service chain of the service data.

BRIEF DESCRIPTION OF DRAWINGS

Features of the present disclosure are described by using non-limitative embodiments and with reference to the accompanying drawings.

DESCRIPTION OF EMBODIMENTS

To make the purpose, technical solutions, and advantages of the embodiments of the present disclosure clearer, the following clearly describes the technical solutions of the embodiments of the present disclosure with reference to the accompanying drawings in the embodiments of the present disclosure.

Figure 1:
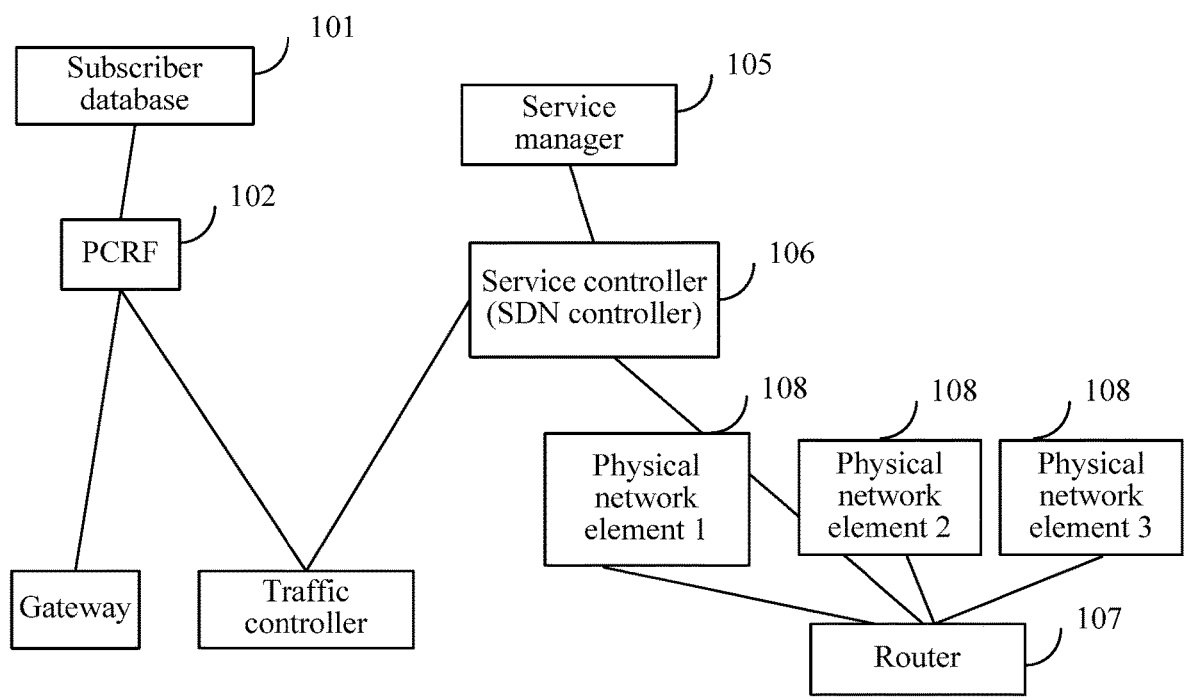
FIG. 1 is a diagram of an existing network architecture for implementing a service in a mobile network.
Figure 2:
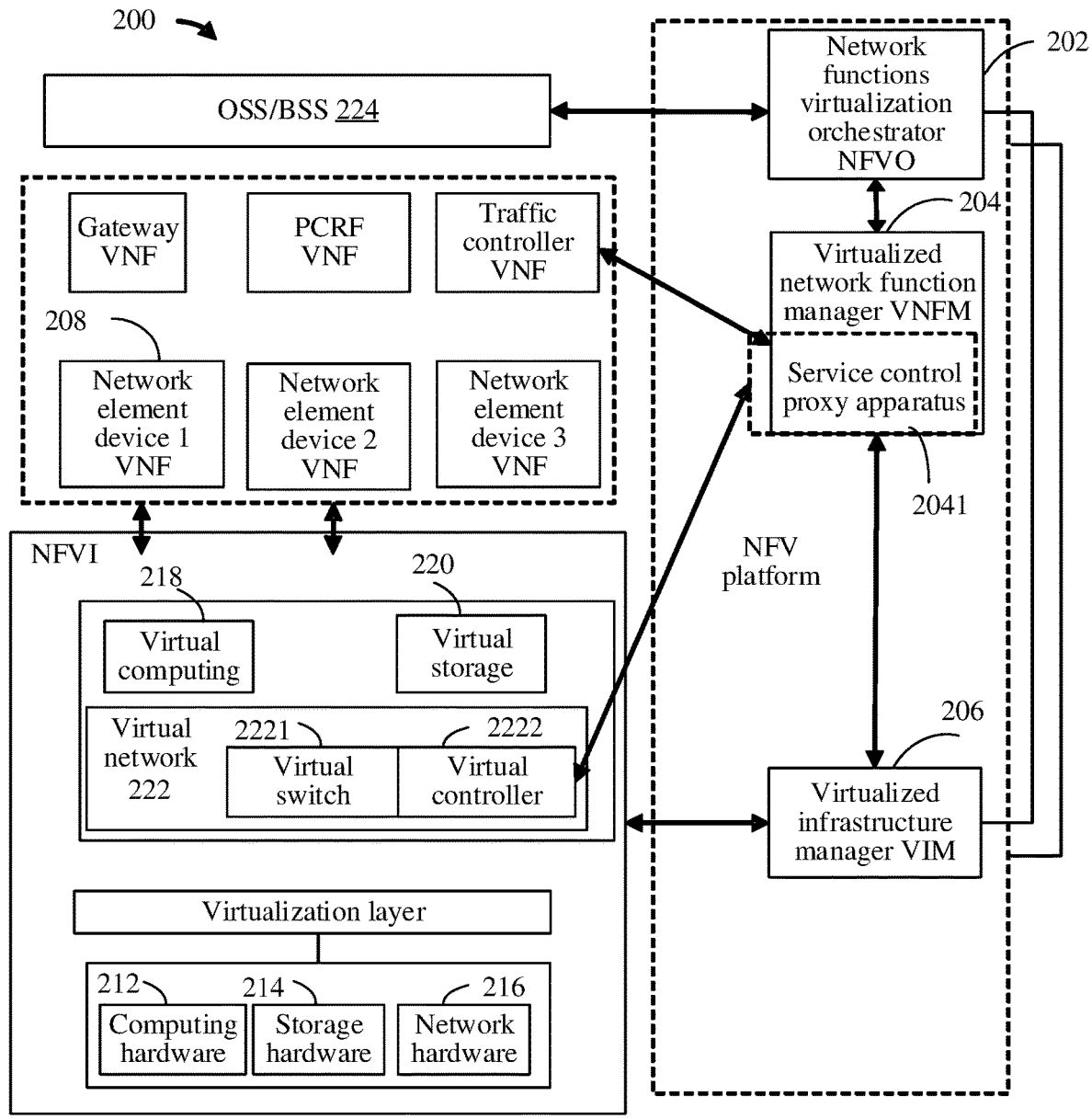
FIG. 2 is a diagram of a network architecture for function virtualization of a mobile network according to an embodiment of the present disclosure.

FIG. 2 provides a schematic architectural diagram of an NFV system 200 according to an embodiment of the present disclosure. The NFV system 200 is configured to obtain, in a cloud computing system, information about a physical service chain for transmitting data of a service in a mobile network. Specifically, in this embodiment of the present disclosure, an existing NFV architecture is used as a basis, and a service control proxy apparatus is added to an NFV platform, to exchange information about a service chain with a VNF of a traffic controller, so as to trigger an NFVO to select an instance of the service chain. In addition, the service control proxy apparatus is further responsible for exchanging the information about the physical service chain with an underlying SDN controller. In addition, in this embodiment of the present disclosure, a correspondence between an address of a virtual controller and an identifier of a path instance is further stored in a VIM.

Specifically, to achieve the objective of the present disclosure, the schematic architectural diagram provided in this embodiment of the present disclosure includes the following functional components: a network functions virtualization orchestrator (NFVO) 202, a virtualized network function manager (VNFM) 204, a virtualized infrastructure manager (VIM) 206, multiple virtualized network functions (VNFs) 208, a network functions virtualization infrastructure (NFVI), and an operations support system and business support system (OSS/BSS) 224.

The NFVO 202 is mainly responsible for lifecycle management of a virtualized service, allocating and scheduling a virtual resource in the virtualization infrastructure NFVI, and the like. The NFVO 202 may communicate with one or more VNFM 204, to execute a resource-relevant request, send configuration information to the VNFM 204, and collect status information of the VNF 208. In addition, the NFVO 202 may also communicate with the VIM 206, to allocate and/or reserve a resource, and exchange configuration information and status information of a virtual hardware resource.

The VNFM 204 is responsible for lifecycle management of one or more VNFs, for example, responsible for instantiating, updating, querying, scaling, or terminating the VNF 208. The VNFM 204 may communicate with the VNF 208 to complete lifecycle management of the VNF and exchange of configuration information and status information. An NFV architecture may include multiple VNFMs that are responsible for performing lifecycle management on different types of VNFs. The NFVO 202 may select and determine different VNFMs 204 for different VNFs 208 according to service types for which the VNFMs are responsible.

A service control proxy apparatus 2041 may be located in the VNFM 204, or may be independent from the VNFM 204. The service control proxy apparatus 2041 is configured to exchange the information about the service chain with the VNF of the traffic controller, and trigger the NFVO to select the instance of the service chain. The service control proxy apparatus is also responsible for exchanging the information about the physical service chain with an underlying SDN controller. The VIM 206 controls and manages interaction between the VNF 208 and computing hardware 212, storage hardware 214, network hardware 216, virtual computing 218, a virtual storage 220, and a virtual network 222. For example, the VIM 206 executes a resource management function, including an infrastructure resource management function, an allocation function (for example, addition of a virtual resource to a virtual container), and an operational function (for example, collection of fault information of the NFVI). The VNFM 204 and the VIM 206 may communicate with each other, to request resource allocation and exchange configuration information and status information of a virtual hardware resource. In addition, information about the identifier of the path instance, an address of each node in a path, a rank of each node in the path, and a corresponding address of a virtual controller is further stored in the VIM 206.

The NFVI is an NFV infrastructure layer and includes a hardware component, a software component, or a combination thereof, so as to create a virtualization environment and deploy, manage, and implement the VNF 208. A virtualization layer of a hardware resource is used to provide virtual resources, for example, virtual machines VMs and a virtual container in another form, to the VNF 208. The hardware resource includes the computing (computing) hardware 212, the storage hardware 214, and the network hardware 216. In an implementation, resources of the computing hardware 212 and the storage hardware 214 may be pooled (pooled) together. The virtualization layer in the NFVI may abstract the hardware resource, and decouple the VNF 208 from an underlying physical network layer. The virtual resource includes the virtual computing 218 (for example, virtual machines, VMs), the virtual storage 220, and the virtual network 222. The virtual computing 218 and the virtual storage 220 are provided to the VNF 208 in a form of VMs and/or other virtual containers by using a system hypervisor (a hypervisor or a container runtime). For example, one or more VNFs 208 may be deployed on one VM. The virtualization layer abstracts the network hardware 216 to form the virtual network 222. The virtual network 222 includes a virtual switch (Vswitch) 2221 and a virtual controller 2222. The virtual switch 2221 provides connections between VMs and/or other virtual containers that hold VNFs. The virtual controller 2222 may interact with the service control proxy apparatus to control routing of the VNF 208. For example, for a service in a mobile network, routing of the VNF 208 is controlled by using an SDN technology.

The multiple virtualized network functions (VNFs) 208 are configured to be virtualization of at least one network function. The VNF 208 may be a virtualized provider edge (PE) node, and is configured to provide all PE network functions on a non-virtualized PE device, for example, a router, a switch, a bridge, a server, or a cloud computing system. Each VNF runs in one virtual container, and corresponds to one group of network functions that belong to one or more physical devices.

The operations support system and business support system (OSS/BSS) 224 supports various end-to-end telecommunication services. Management functions supported by the OSS include network configuration, service provisioning, fault management, and the like. The BSS processes an order, payment, revenue, and the like, and supports product management, order management, revenue management, and customer management.

A VNF entity may be a computer apparatus. In addition, because the VNF entity is virtualization of one or more network functions, and corresponds to a network function of one or more physical network elements, the VNF entity is also referred to as a virtualized network element.

Figure 3:
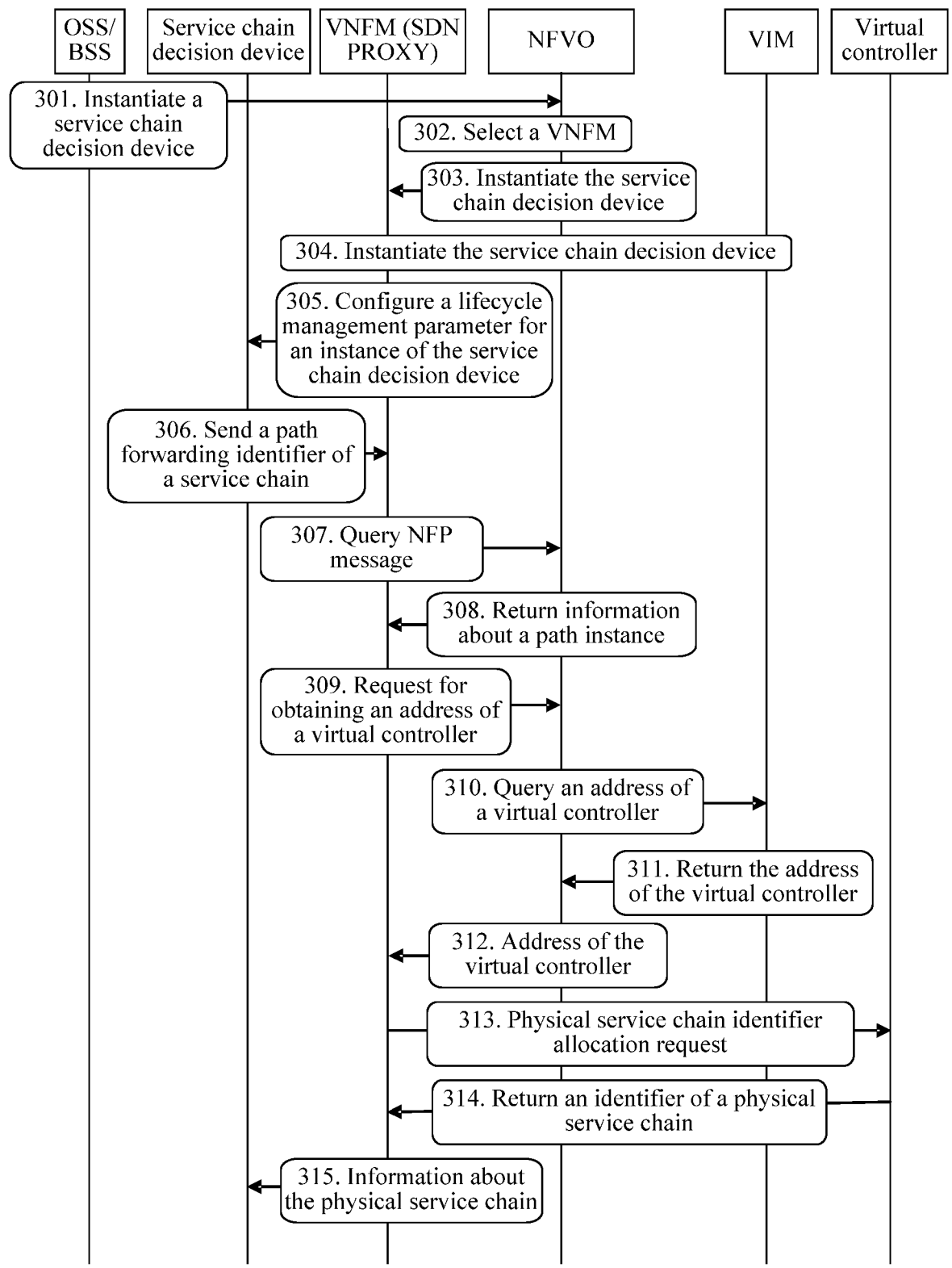
FIG. 3 is a flowchart of a method for obtaining information about a service chain according to an embodiment of the present disclosure.

FIG. 3 is a flowchart of a method for obtaining information about a service chain according to an embodiment of the present disclosure. The method includes the following steps.

Step 301: An OSS/BSS sends a service chain decision device instantiation request to an NFVO. The service chain decision device instantiation request is used to request the NFVO to generate an instance used for a service chain decision network element, and request the NFVO to allocate a resource to the service chain decision device, so that the service chain decision device can run in a virtualized environment.

Specifically, the service chain decision device may be a VNF network element of the traffic controller or a PCRF network element or another element in FIG. 2. The service chain decision device is a network element that provides an identifier of a service chain to the virtual controller (for example, a virtual SDN controller) in the virtual network in FIG. 2. In this embodiment of the present disclosure, an example in which the service chain decision device is a traffic controller is used for description.

Further, the service chain decision device instantiation request carries an identifier of a VNFD (VNF Descriptor) describing the service chain decision device. The VNFD is used to describe a VNF, for example, describe a function of the VNF and a requirement for instantiation of the VNF. In this embodiment of the present disclosure, the identifier of the VNFD of the service chain decision device is an identifier of the traffic controller.

Step 302: The NFVO receives the service chain decision device instantiation request, obtains a VNFD of the service chain decision device according to an identifier, in the request, of the VNFD of the service chain decision device, and then selects a VNFM according to the obtained VNFD.

Further, the NFVO determines, according to the obtained VNFD, whether the VNFD includes a requirement for a service control proxy apparatus (for example, a requirement for an SDN proxy). When the NFVO determines that the VNFD includes a requirement for a service control proxy apparatus, the NFVO selects, for the service chain decision device, a VNFM that includes a service control proxy apparatus. When determining that the VNFD does not include a requirement for a service control proxy apparatus, the NFVO may select, for the service decision network element, a VNFM that includes a service control proxy apparatus or a VNFM that does not include a service control proxy apparatus. In this embodiment of the present disclosure, an example in which the NFVO determines that the VNFD includes a requirement for a service control proxy apparatus is used for description.

For example, that the NFVO determines, according to the obtained VNFD, whether the VNFD includes a requirement for a service control proxy apparatus may be specifically: determining, by the NFVO, whether platform requirements in the VNFD include a parameter of a service control proxy apparatus (for example, an SDN proxy). If the NFVO determines that the platform requirements in the VNFD include a parameter of a service control proxy apparatus, the NFVO determines that the VNFD of the service decision network element includes a requirement for a service control proxy apparatus. After determining that the VNFD includes a requirement for a service control proxy apparatus, the NFVO selects, for the service decision network element, a VNFM that includes a service control proxy apparatus.

Specifically, information included in the VNFD of the service chain decision device is shown in Table 2.

TABLE 2

| Identity | Description |
|---|---|
| ID | Identifier of the VNFD |
| Vendor | Provider providing the VNF |
| VDU (virtualization deployment unit) | Information about a requirement of a virtual computing unit for a resource, for example, requirements of the virtual computing unit for resources such as a CPU and a storage |
| Platform requirements: SDN proxy | Requirement for an SDN proxy |

One VNFD may include one or more VDU parameters. One VDU parameter corresponds to one virtual computing unit. If a VNF includes multiple virtual computing units, each virtual computing unit needs to correspond to one VDU parameter in the VNFD.

Step 303: The NFVO sends a request for instantiating a VNF of a service chain decision device to the selected VNFM that includes a service control proxy apparatus, where the request for instantiating a VNF of a service chain decision device includes the identifier of the VNFD in step 301.

In an optional manner, the service control proxy apparatus may be an entity independent from the VNFM. In step 302, after obtaining the VNFD of the service chain decision network element, the NFVO may select, for the service chain decision device, a VNFM that does not include a service control proxy apparatus, and select a service control proxy apparatus for the service chain decision device. Then, the NFVO sends the request for instantiating a VNF of a service chain decision device to the selected VNFM that does not include a service control proxy apparatus. The request that is for instantiating a VNF of a service chain decision device and that is sent to the VNFM that does not include a service control proxy apparatus includes an identifier of the selected service control proxy apparatus. The identifier of the service control proxy apparatus may be an address of the service control proxy apparatus.

Step 304: After receiving the request that is for instantiating a VNF of a service chain decision device and that is sent by the NFVO, the VNFM executes, according to the VNFD of the service chain decision device, a procedure of instantiating the service chain decision device.

Specifically, the VNFM in this step is a VNFM that includes a service control proxy apparatus.

Specifically, for a procedure in which after obtaining the request that is for instantiating a VNF of a service chain decision device and that is sent by the NFVO, the VNFM obtains the VNFD according to the identifier of the VNFD and instantiates the service chain decision device according to the obtained VNFD, refer to the prior art. Details are not described herein in this embodiment of the present disclosure.

In an optional manner, the VNFM may obtain the VNFD from a database according to the identifier of the VNFD. Specifically, the database may be located in the NFVO, or may be independent from the NFVO.

Step 305: The VNFM configures a lifecycle management parameter for the instance of the service chain decision device.

For example, an IP address, a running program script, and a parameter in the script that are required for the service chain decision device are configured. This is not described in detail and not limited herein in this embodiment of the present disclosure.

In an optional manner, if the VNFM does not include a service control proxy apparatus, in this step, in the process of configuring the lifecycle management parameter for the instance of the service chain decision device after the service chain decision device is instantiated, the VNFM further needs to configure the address of the service control proxy apparatus for the instance of the service chain decision device according to the identifier of the service control proxy apparatus that is carried in the request that is for instantiating a VNF of a service chain decision device and that is from the NFVO in step 503. Therefore, when determining to obtain information that is about a physical service chain and that is used to transmit service data, the service chain decision device sends a path forwarding identifier to the service control proxy apparatus according to the configured address of the service control proxy apparatus. After receiving the path forwarding identifier, the service control proxy apparatus eventually sends the obtained information about the physical service chain to the service chain decision device.

It should be noted that, steps 301 to 305 are described for completeness of the solution, and are not essential steps for implementing this embodiment of the present disclosure. Especially, in step 302, if all VNFMs support a service control proxy apparatus, implementations of steps 301 to 305 are the same as those in the prior art. When none of the VNFMs includes a service control proxy apparatus, and all service control proxy apparatuses are independent from all the VNFMs, step 302 is further used to select a service control proxy apparatus, and the address of the service control proxy apparatus is configured for the instance of the service chain decision device in step 305.

Step 306: After receiving data of a service in a mobile network, the service chain decision device obtains a path forwarding identifier for transmitting the service data, and then, the service chain decision device sends, to a service control proxy apparatus (for example, an SDN proxy), the path forwarding identifier of a path used to transmit the service data.

Specifically, the service chain decision device sends, by using the VNFM, the path forwarding identifier to the service control proxy apparatus included in the VNFM.

Specifically, the path forwarding identifier may be represented in NFV by using a forwarding path ID. The forwarding path ID is used to identify a logical service chain. For example, the path forwarding identifier is video optimization.

It should be noted that, an example in which the service chain decision device is a traffic controller is used for description in this embodiment. If the service chain decision device is a PCRF, the PCRF may select the path forwarding identifier for data according to another NFV network element (for example, a type (for example, a video stream or a common web page access, where it is assumed that the type is a video stream in this example) of the service data sent by a network element that performs a function of a gateway, subscriber information, and a type of a network carrying the data (for example, 3G or Long Term Evolution (LTE)). Specifically, the PCRF may obtain a subscription information table, shown in Table 3, of a subscriber according to the subscriber information, and select the path forwarding identifier: video optimization according to the subscription information table of the subscriber, the type (3G) of the network carrying the data, and the type (video) of the data.

TABLE 3

| Subscriber | Data type | Network type | Path forwarding identifier |
|---|---|---|---|
| IMSI: 46001x | Video | 3G | Video optimization |
| IMSI: 46001x | Web | 3G | HTTP |

Then, the PCRF sends the selected path forwarding identifier to a VNF of a traffic controller network element.

If the traffic controller network element is used as the service chain decision device, the service chain decision device may also obtain, from the PCRF network element, the path forwarding identifier for transmitting the data. A method for selecting an identifier of a logical service chain by the PCRF is the same as the description above (or the same as the prior art), and details are not described herein again.

307: The service control proxy apparatus receives the path forwarding identifier that is of the path used to transmit the service data and that is sent by the service chain decision device, and sends a path instance allocation request message to the NFVO, where the path instance allocation request message carries the forwarding path ID.

Specifically, the service control proxy apparatus may send the path instance allocation request message to the NFVO by using an interface of the VNFM.

For example, the path instance allocation request message may be a query NFP message. That is, the service control proxy apparatus requests, by using the query NFP message, the NFVO to allocate a path instance whose forwarding path ID is video optimization to the service chain decision device, and obtains information about the allocated path instance. The query NFP message may be a new extended message on a network service lifecycle management interface, and the query NFP message includes the forwarding path ID.

Step 308: The NFVO returns, to the service control proxy apparatus, information about a path instance, or information about a path instance and information about a VIM managing the path instance.

Specifically, after receiving the path instance allocation request message that is sent by the VNFM, the NFVO may obtain, according to the forwarding path ID from a database that stores instances, the information that is about the path instance and that corresponds to the forwarding path ID, and obtain, according to the obtained information about the path instance, the information about the VIM managing the path instance.

If the NFVO obtains at least two path instances that correspond to the forwarding path ID, the NFVO selects one path instance from the obtained path instances. Specifically, a method for selecting one path instance from the obtained path instances by the NFVO may be selecting an instance with the least load in the instances. This is not limited and not described in detail in the present disclosure.

The NFVO returns the information about the selected path instance to the service control proxy apparatus. Specifically, the NFVO may return the information to the service control proxy apparatus by using the VNFM. The information about the path instance includes the path forwarding identifier, an identifier of the path instance, an address of each node in the path, a rank of each node in the path, and the like.

For example, the information about the path instance selected by the NFVO is shown in Table 4.

TABLE 4

| Path forwarding identifier | Identifier of the path instance | Addresses and sequence of nodes |
|---|---|---|
| Video optimization | Video 1 | 10.10.1.1 -> 10.10.2.2 -> 10.10.4 |

In the information about the addresses and sequence of the nodes, the sequence of the nodes may be represented by using an arrow, or may be represented by using another symbol and number. For example, a node whose node address is 10.10.1.1 is the first node in the path, a node whose node address is 10.10.2.2 is the second node in the path, and a node whose node address is 10.10.4 is the third node in the path.

Specifically, representation of the addresses of the nodes in the path and the rank of each node in the path belongs to the prior art, and is not limited and not further described in detail herein in this embodiment of the present disclosure.

It should be noted that, steps 307 and 308 are used as specific implementations of obtaining, by the service control proxy apparatus, the information that is about the path instance and that corresponds to the path forwarding identifier.

309. The service control proxy apparatus sends a request for obtaining an address of a virtual controller (for example, an SDN controller) to the NFVO, where the request for obtaining an address of a virtual controller (for example, an SDN controller) carries an identifier of the path instance selected by the NFVO.

Further, the request for obtaining an address of a virtual controller may further carry the information about the VIM managing the selected path instance.

310. The NFVO receives the request that is for obtaining an address of a virtual controller and that is sent by the service control proxy apparatus, and sends the request for obtaining an address of a virtual controller to the VIM responsible for managing the path instance, where the request for obtaining an address of a virtual controller carries the identifier of the path instance selected by the NFVO.

Specifically, if the request for obtaining an address of a virtual controller carries the information about the VIM managing the selected path instance, the NFVO sends the request for obtaining an address of a virtual controller to the VIM indicated by the information about the VIM managing the selected path instance. If the request for obtaining an address of a virtual controller does not carry the information about the VIM managing the selected path instance, the NFVO further needs to first obtain, according to the information about the path instance selected by the NFVO in step 308, the information about the VIM managing the selected path instance, and then send the request for obtaining an address of a virtual controller to the VIM indicated by the information about the VIM managing the selected path instance.

311. The VIM returns an address of a virtual controller managing the path instance to the NFVO.

Specifically, the VIM stores a correspondence between a path instance and an address of a virtual controller managing the path instance.

For example, the correspondence that is between information of an instance and an address of a virtual controller and that is stored in the VIM is shown in Table 5.

TABLE 5

| Instance identifier | Instance type | Addresses and sequence of nodes | Network |
| --- | --- | --- | --- |
| Video 1 | Video | 10.10.1.1 -><br>10.10.2.2 -><br>10.10.4 | Address of a virtual controller |

The VIM may obtain, according to the received identifier of the path instance, the address that is of the virtual controller and that corresponds to the identifier of the path instance, and then return the address of the virtual controller to the NFVO.

In an optional solution, the request for obtaining an address of a virtual controller in step 310 carries the addresses and sequence of the nodes in the path instance selected by the NFVO. In step 311, after receiving the request that is for obtaining an address of a virtual controller and that is sent by the service control proxy apparatus, the VIM may obtain the address that is of the virtual controller and that corresponds to the identifier of the path instance. The identifier of the path instance corresponds to the address of each node in the path and the rank of each node in the path.

In another optional solution, the request for obtaining an address of a virtual controller in step 310 carries the identifier of the path instance and the addresses and sequence of the nodes. In step 311, after receiving the request that is for obtaining an address of a virtual controller and that is sent by the service control proxy apparatus, the VIM may obtain the address of the virtual controller according to a correspondence between an identifier of a path instance and an address of a virtual controller.

312. The NFVO receives the address of the virtual controller that is returned by the VIM, and sends the received address of the virtual controller (for example, a virtual SDN controller) to the service control proxy apparatus.

It should be noted that, steps 309 to 312 are used as specific implementations of obtaining, by the service control proxy apparatus, the address that is of the virtual controller and that corresponds to the identifier of the path instance.

313. The service control proxy apparatus receives the address of the virtual controller that is sent by the NFVO, and sends a physical service chain identifier obtaining request to the virtual controller (for example, an SDN controller) by using the information that is about the path instance and that is received in step 308, where the information about the path instance is, for example, the identifier of the path instance and an IP address of each node in the path and the rank of each node in the path.

Specifically, the physical service chain identifier obtaining request carries the address (for example, an IP address) of each node in the path and the rank of each node in the path.

314. After receiving the physical service chain identifier obtaining request that is sent by the service control proxy apparatus, the virtual controller sends an identifier of a physical service chain to the service control proxy apparatus in the VNFM.

Specifically, the virtual controller generates information about the physical service chain according to the received address (for example, the IP address) of each node in the path and the received rank of each node in the path. The information about the physical service chain includes information about the identifier of the physical service chain, the rank of each node, and the address of each node. Then, the virtual controller sends the information about the identifier of the physical service chain, the rank of each node, and the address of each node to the service control proxy apparatus. For example, the information about the physical service chain may be a forwarding and routing table, as shown in Table 6.

TABLE 6

| Physical service chain identifier | Rank | Next-hop address |
| --- | --- | --- |
| 10 | 3 | 10.10.1.1 |
| 10 | 2 | 10.10.2.2 |
| 10 | 1 | 10.10.4.4 |

In addition, in an optional manner, the virtual controller may return only the identifier of the physical service chain corresponding to the identifier of the path instance, and then, the virtual controller sends the identifier of the physical service chain and the address and the rank of each node in Table 3 to the service chain decision device.

It should be noted that, steps 313 and 314 are specific implementations of obtaining, by the service control proxy apparatus, the identifier of the physical service chain from the virtual controller according to the address of the virtual controller.

315. After receiving the identifier that is of the physical service chain and that is sent by the virtual controller, the service control proxy apparatus sends the received information about the physical service chain to the service chain decision device, where the information about the physical service chain is used to instruct to route and forward the data of the service in the mobile network.

Specifically, a traffic controller further adds a new packet header to each received data packet. The packet header includes the identifier of the physical service chain and a first rank in the received routing and forwarding table. The first rank indicates a rank in the first row in the routing and forwarding table.

For example, according to the routing and forwarding table shown in Table 6, the service traffic controller adds a new packet header to a received data packet. Information in the packet header includes an identifier 10 of a physical service chain and a rank 3.

In another optional manner, the service control proxy apparatus may be independent from the VNFM.

Figure 5:
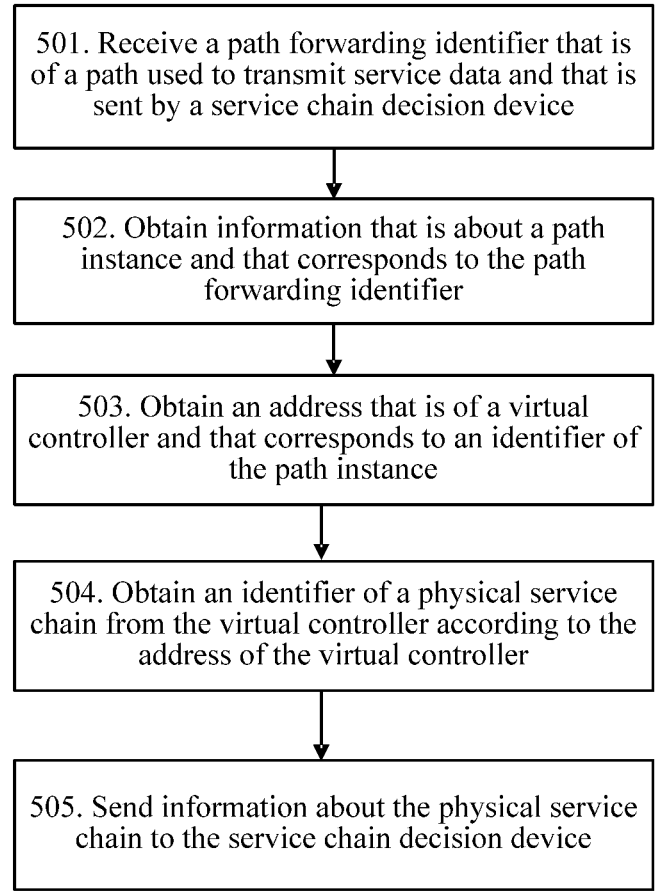
FIG. 5 is a flowchart of another method for obtaining information about a service chain according to an embodiment of the present disclosure.

FIG. 5 is a flowchart of a method for obtaining information about a service chain in a cloud computing system according to an embodiment of the present disclosure. Specifically, a service control proxy apparatus in a procedure in this embodiment of the present disclosure may be included in a VNFM, or may be independent from a VNFM. This is not limited in this embodiment of the present disclosure. This embodiment of the present disclosure includes the following steps.

Step 501: The service control proxy apparatus receives a path forwarding identifier that is of a path used to transmit data of a service in a mobile network and that is sent by a service chain decision device.

Step 502: The service control proxy apparatus obtains information that is about a path instance and that corresponds to the path forwarding identifier, where the information about the path instance includes an identifier of the path instance.

Specifically, after receiving the path forwarding identifier, the service control proxy apparatus sends a path instance allocation request message to a network functions virtualization orchestrator NFVO. The path instance allocation request message carries the path forwarding identifier.

After receiving the path instance allocation request message, the NFVO returns the information about the path instance to the service control proxy apparatus. The information about the path instance includes the identifier that is of the path instance and that corresponds to the path forwarding identifier, an address of each node in the path, and a rank of each node in the path. In an optional solution, the NFVO may further send information about a virtualized infrastructure manager VIM managing the path instance to the service control proxy apparatus.

Step 503: The service control proxy apparatus obtains an address that is of a virtual controller and that corresponds to the identifier of the path instance.

Specifically, the service control proxy apparatus may send a request for obtaining an address of a virtual controller to the NFVO. The request for obtaining an address of a virtual controller carries the identifier of the path instance and the information about the VIM. The NFVO sends, according to the information about the VIM managing the path instance, the request for obtaining an address of a virtual controller to the VIM managing the path instance. After receiving the request that is for obtaining an address of a virtual controller and that carries the identifier of the path instance, the VIM obtains, according to stored information, the address that is of the virtual controller and that corresponds to the identifier of the path instance, and then sends the address of the virtual controller to the NFVO, and the NFVO sends the address of the virtual controller to the service control proxy apparatus.

In an optional solution, the request for obtaining an address of a virtual controller carries the identifier of the path instance, but does not include the information about the VIM. After receiving the request for obtaining an address of a virtual controller, the NFVO obtains, according to the identifier of the path instance, the information about the VIM managing the selected path instance. Then, the NFVO sends, according to the information about the VIM managing the path instance, the request for obtaining an address of a virtual controller to the VIM managing the path instance. After receiving the request that is for obtaining an address of a virtual controller and that carries the identifier of the path instance, the VIM obtains, according to stored information, the address that is of the virtual controller and that corresponds to the identifier of the path instance, and then sends the address of the virtual controller to the NFVO, and the NFVO sends the address of the virtual controller to the service control proxy apparatus.

In another optional solution, the service control proxy apparatus may send the request for obtaining an address of a virtual controller to the NFVO. The request for obtaining an address of a virtual controller carries the address of each node in the path, the rank of each node in the path, and the information about the VIM. The NFVO sends, according to the information about the VIM managing the path instance, the request for obtaining an address of a virtual controller to the VIM managing the path instance. After receiving the request that is for obtaining an address of a virtual controller and that carries the identifier of the path instance, the VIM obtains, according to stored information, the address that is of the virtual controller and that corresponds to the identifier of the path instance. The identifier of the path instance corresponds to the address of each node in the path and the rank of each node in the path. Then, the VIM sends the address of the virtual controller to the NFVO, and the NFVO sends the address of the virtual controller to the service control proxy apparatus.

In another optional solution, the request for obtaining an address of a virtual controller carries the address of each node in the path, the rank of each node in the path, and the information about the VIM, but does not include the information about the VIM. After receiving the request for obtaining an address of a virtual controller, the NFVO obtains, according to the identifier of the path instance, the information about the VIM managing the selected path instance. Then, the NFVO sends, according to the information about the VIM managing the path instance, the request for obtaining an address of a virtual controller to the VIM managing the path instance. After receiving the request that is for obtaining an address of a virtual controller and that carries the identifier of the path instance, the VIM obtains, according to stored information, the address that is of the virtual controller and that corresponds to the identifier of the path instance. The identifier of the path instance corresponds to the address of each node in the path and the rank of each node in the path. Then, the VIM sends the address of the virtual controller to the NFVO, and the NFVO sends the address of the virtual controller to the service control proxy apparatus.

Step 504: The service control proxy apparatus obtains, from the virtual controller according to the address of the virtual controller, information that is about a physical service chain and that corresponds to the identifier of the path instance, where the information about the physical service chain includes an identifier of the physical service chain, information about an address of each node in the physical service chain, and a rank of each node in the physical service chain.

Specifically, the service control proxy apparatus sends a physical service chain identifier obtaining request to the virtual controller according to the address of the virtual controller. The physical service chain identifier obtaining request carries the address of each node in the path and the rank of each node in the path.

The virtual controller receives the physical service chain identifier obtaining request that is sent to the virtual controller by the service control proxy apparatus, generates the identifier of the physical service chain according to the address of each node in the path and the rank of each node in the path that are carried in the request, and sends the identifier of the physical service chain to the service control proxy apparatus.

The service control proxy apparatus receives the identifier that is of the physical service chain and that is sent by the virtual controller.

Step 505: The service control proxy apparatus sends the information about the physical service chain to the service chain decision device, where the information about the physical service chain is used to instruct to route and forward the data of the service in the mobile network.

In the foregoing solution, a service control proxy apparatus in this embodiment of the present disclosure may interact with a service chain decision network element to receive a path forwarding identifier that is of a path used to transmit data of a service in a mobile network and that is sent by the service chain decision device; interact with an NFVO to obtain an address of a virtual controller; then interact with the virtual controller to obtain information about a physical service chain from the virtual controller; and send the information about the physical service chain to the service chain decision device. In this way, in a cloud computing system, routing information is provided to implement transmission of service data of a service in a mobile network.

Figure 4:
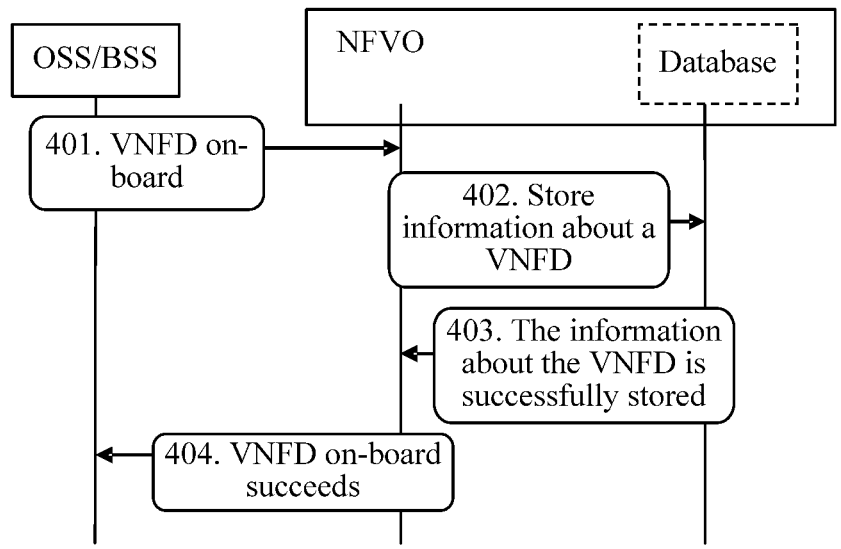
FIG. 4 is a flowchart of storing a VNF descriptor of a traffic controller according to an embodiment of the present disclosure.

FIG. 4 is a flowchart of storing a VNF descriptor of a traffic controller according to an embodiment of the present disclosure. The following steps are included.

Step 401: An OSS/BSS sends a request for storing a VNF descriptor (VNFD) of a VNF of a traffic controller to an NFVO, where the storing request includes the VNFD of the traffic controller, and the VNFD includes an identifier of the VNFD of the traffic controller.

Specifically, the storing request is mainly used to store the VNFD in a database by using the NFVO. When there is subsequently an operation request related to the VNF, for example, a traffic controller instantiation request, only an identifier of a VNFD of the VNF needs to be carried. The NFVO searches for, according to the identifier of the VNFD, information that is about the VNFD and that is stored in the database, and completes a required operation according to the information about the VNFD. For example, the VNFD is the VNFD of the traffic controller. The traffic controller in this embodiment needs to be deployed as a VNF network element, and information about a service chain needs to be dynamically exchanged with a virtual controller in an NFVI after service data is received. Therefore, when the OSS/BSS deploys the VNF, an NFV platform needs to have a capability of providing a service control proxy apparatus (for example, an SDN proxy). Therefore, the VNFD of the traffic controller further includes information about a requirement for the SDN proxy.

For example, the VNFD may be described in the TOSCA language, for example, flowRouterVNF123:
   type: tosca.nodes.nfv.VNF.router
   properties:
     Scaling_methodology:
     Flavour_ID:
     Threshold:
     Auto-scale policy value:
     PlatfromRequirements:
       SDN proxy
   artifacts:
     software_image Specifically, flowRouterVNF123 is the identifier of the VNFD.

That a type of the VNF is a router is defined by "type: tosca.nodes.nfv.VNF.router".

Parameters of the VNF are defined by "properties". For example, the parameters may include a scaling methodology "Scaling_methodology", a deployment flavor "Flavour_ID", a scaling threshold "Threshold", an auto-scale policy value "Auto-scale policy value", and the like. These parameters are not limited in this embodiment of the present disclosure, and are not described one by one. Further, in this embodiment of the present disclosure, the parameter platform requirements "PlatfromRequirements" is further added to the VNFD to describe a requirement for the platform. "SDN Proxy" indicates that the platform needs to have a capability of providing an SDN proxy, for example, the platform needs to include a service control proxy apparatus.

The parameter "artifacts" is used to carry all images required to deploy the VNF. The images include software having a function of the VNF and the like.

Step 402: The NFVO determines that information about the VNFD is correct, for example, determines that each parameter in the VNFD can be recognized and various requirements can be satisfied, and stores the information about the VNFD in a database.

Specifically, in this embodiment of the present disclosure, the database may be configured inside the NFVO, or may be independent from the NFVO. This is not limited in this embodiment of the present disclosure.

Step 403: Complete storage of the information about the VNFD in the database.

Step 404: The NFVO sends, to the OSS/BSS, a response indicating that the on-board request is successfully completed.

Figure 6:
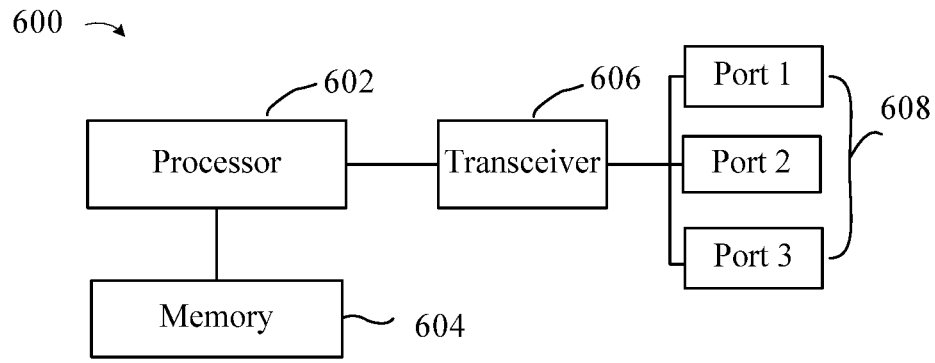
FIG. 6 is a schematic structural diagram of a network element according to an embodiment of the present disclosure.

FIG. 6 is a schematic structural diagram of a network element 600 used as a service control proxy apparatus according to an embodiment of the present disclosure. The network element is configured to transmit or process data in the NFV system shown in FIG. 2. The network element 600 may include one or more ports 608 coupled to a transceiver 606. The transceiver 606 may be a transmitter, a receiver, or a combination thereof, and sends a data packet to or receives a data packet from another network node by using the port 608. A processor 602 is coupled to the transceiver 606, and is configured to process a data packet. The processor 602 may include one or more multi-core processors and/or a memory 604. The processor 602 may be a general-purpose processor, an application-specific integrated circuit (ASIC), or a digital signal processor (DSP).

The memory 604 may be a non-transitory storage medium, is coupled to the processor 602, and is configured to store different types of data. The memory 604 may include a read-only memory (ROM), a random access memory (RAM), or another type of dynamic storage device that can store information and an instruction, or may be a magnetic disk memory. The memory 604 may be configured to store an instruction for implementing an NFV system or a related method. It can be understood that, an executable instruction may be programmed or loaded onto at least one of the processor 602, a cache, or a long-term memory of the network element 600.

The network element 600 may execute one or more instructions according to this embodiment of the present disclosure to obtain information about a service chain. These instructions may be stored in the memory 604, or may be integrated in a kernel or a plug-in of a kernel of an operating system of the network element.

In another embodiment, the network element 600 is used as a service control proxy apparatus, and includes the memory 604, the processor 602, the transceiver 606, and the one or more ports 608 coupled to the transceiver. The memory 604 is configured to store computer executable program code. The processor 602 is coupled to the memory 604 and the transceiver 606.

The program code includes an instruction. When the processor executes the instruction, the instruction enables the network element to perform the following operations:
   receiving a path forwarding identifier that is of a path used to transmit service data and that is sent by a service chain decision device;
   obtaining information that is about a path instance and that corresponds to the path forwarding identifier, where the information about the path instance includes an identifier of the path instance;
   obtaining an address that is of a virtual controller and that corresponds to the identifier of the path instance;

obtaining an identifier of a physical service chain from the virtual controller according to the address of the virtual controller; and sending information about the physical service chain to the service chain decision device, where the information about the physical service chain includes the identifier of the physical service chain, an address of each node in the path, and a rank of each node in the path, and the information about the physical service chain is used to instruct to route and forward the service data.

For specific implementations of the operations performed by the processor included in the foregoing network element used as a service control proxy apparatus, refer to the corresponding steps performed by the service control proxy apparatus in the embodiments in FIG. 2 to FIG. 5. Details are not described again in this embodiment of the present disclosure.

Figure 7:
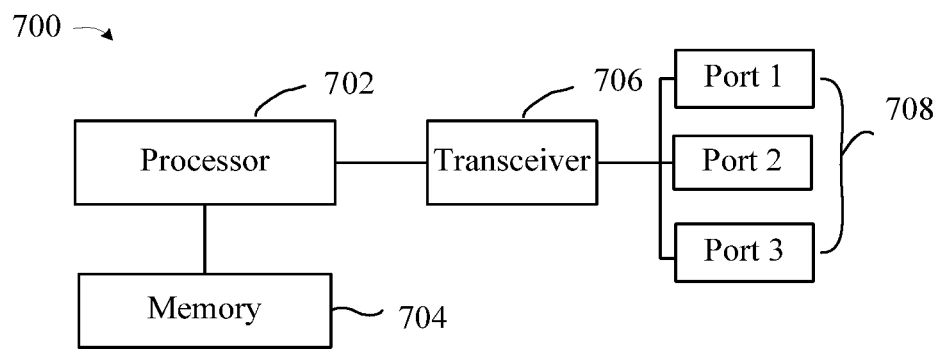
FIG. 7 is a schematic structural diagram of another network element according to an embodiment of the present disclosure.

FIG. 7 is a schematic structural diagram of a network element used as an NFVO according to an embodiment of the present disclosure. The network element 700 may include one or more ports 708 coupled to a transceiver 706. The transceiver 706 may be a transmitter, a receiver, or a combination thereof, and sends a data packet to or receives a data packet from another network node by using the port 708. A processor 702 is coupled to the transceiver 706, and is configured to process a data packet. The processor 702 may include one or more multi-core processors and/or a memory 704. The processor 702 may be a general-purpose processor, an application-specific integrated circuit (application specific integrated circuit, ASIC), or a digital signal processor (DSP).

The memory 704 may be a non-transitory storage medium, is coupled to the processor 702, and is configured to store different types of data. The memory 704 may include a read-only memory (ROM), a random access memory (RAM), or another type of dynamic storage device that can store information and an instruction, or may be a magnetic disk memory. The memory 704 may be configured to store an instruction for implementing an NFV system or a related method. It can be understood that, an executable instruction may be programmed or loaded onto at least one of the processor 702, a cache, or a long-term memory of the network element 700.

In another embodiment, the network element 700 is used as an NFVO, and includes the memory 704, the processor 702, the transceiver 706, and the one or more ports 708 coupled to the transceiver. The memory 704 is configured to store computer executable program code. The processor 702 is coupled to the memory 704 and the transceiver 706.

The program code includes an instruction. When the processor executes the instruction, the instruction enables the network element to perform the following operations:

receiving a path instance allocation request message that is sent by a service control proxy apparatus, where the path instance allocation request message carries the path forwarding identifier;

returning information about a path instance to the service control proxy apparatus, where the information about the path instance includes an identifier that is of the path instance and that corresponds to the path forwarding identifier, an address of each node in the path, and a rank of each node in the path;

receiving a request that is for obtaining an address of a virtual controller and that is sent by the service control proxy apparatus, where the request for obtaining an address of a virtual controller carries the identifier of the path instance;

sending the request for obtaining an address of a virtual controller to a virtualized infrastructure manager VIM managing the path instance indicated by the identifier of the path instance;

receiving an address of a virtual controller that is returned by the VIM; and sending the address of the virtual controller to the service control proxy apparatus, where the address of the virtual controller is used to indicate the virtual controller that provides an identifier of a physical service chain.

For specific implementations of the operations performed by the processor included in the foregoing network element used as an NFVO, refer to the corresponding steps performed by the service control proxy apparatus in the embodiments in FIG. 2 to FIG. 5. Details are not described again in this embodiment of the present disclosure.

Figure 8:
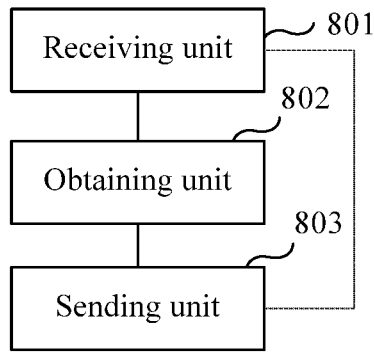
FIG. 8 is a schematic structural diagram of a service control proxy apparatus according to an embodiment of the present disclosure.

FIG. 8 is a simplified functional block diagram of a service control proxy apparatus in an NFV system. The service control proxy apparatus is configured to obtain information about a service chain.

The service control proxy apparatus includes a receiving unit 801, an obtaining unit 802, and a sending unit 803.

The receiving unit 801 is configured to receive a path forwarding identifier that is of a path used to transmit service data and that is sent by a service chain decision device. The obtaining unit 802 is configured to: obtain information that is about a path instance and that corresponds to the path forwarding identifier, where the information about the path instance includes an identifier of the path instance, an address of each node in the path, and a rank of each node in the path; obtain an address that is of a virtual controller and that corresponds to the identifier of the path instance; and obtain an identifier of a physical service chain from the virtual controller according to the address of the virtual controller, the address of each node in the path, and the rank of each node in the path. The sending unit 803 is configured to send information about the physical service chain to the service chain decision device, where the information about the physical service chain includes the identifier of the physical service chain, the address of each node in the path, and the rank of each node in the path, and the information about the physical service chain is used to instruct to route and forward the service data.

Optionally, that the obtaining unit 802 obtains the information that is about the path instance and that corresponds to the path forwarding identifier specifically includes: sending a path instance allocation request message to a network functions virtualization orchestrator NFVO, where the path instance allocation request message carries the path forwarding identifier; and receiving the information that is about the path instance and that is returned by the NFVO.

Optionally, the receiving unit 801 is further configured to receive information that is about a virtualized infrastructure manager VIM managing the path instance and that is sent by the NFVO.

That the obtaining unit obtains the address that is of the virtual controller and that corresponds to the identifier of the path instance includes:

sending a request for obtaining an address of a virtual controller to the NFVO, where the request for obtaining an address of a virtual controller carries the identifier of the path instance and the information about the VIM, and the information about the VIM is used to indicate the VIM that provides the address that is of the virtual controller and that corresponds to the identifier of the path instance; and receiving the address of the virtual controller that is sent by the NFVO; or sending a request for obtaining an address of a virtual controller to the NFVO, where the request for obtaining an address of a virtual controller carries the address of each node in the path, the rank of each node in the path, and the information about the VIM, the information about the VIM is used to indicate the VIM that provides the address that is of the virtual controller and that corresponds to the identifier of the path instance, and the identifier of the path instance corresponds to the address of each node in the path and the rank of each node in the path; and receiving the address of the virtual controller that is sent by the NFVO.

Optionally, that the obtaining unit 802 obtains the address that is of the virtual controller and that corresponds to the identifier of the path instance specifically includes:

sending a request for obtaining an address of a virtual controller to the NFVO, where the request for obtaining an address of a virtual controller carries the identifier of the path instance, and the request for obtaining an address of a virtual controller is used for instructing the NFVO to obtain, according to the identifier of the path instance, information about a VIM managing the path instance, and obtain, from the VIM indicated by the information about the VIM, the address that is of the virtual controller and that corresponds to the identifier of the path instance; and receiving the address of the virtual controller that is sent by the NFVO; or sending a request for obtaining an address of a virtual controller to the NFVO, where the request for obtaining an address of a virtual controller carries the address of each node in the path and the rank of each node in the path, the request for obtaining an address of a virtual controller is used for instructing the NFVO to obtain information about a VIM managing the path instance that includes the address of each node in the path and the rank of each node in the path, and obtain, from the VIM indicated by the information about the VIM, the address that is of the virtual controller and that corresponds to the identifier of the path instance, and the identifier of the path instance corresponds to the address of each node in the path and the rank of each node in the path; and receiving the address of the virtual controller that is sent by the NFVO.

Optionally, that the obtaining unit 802 obtains the identifier of the physical service chain from the virtual controller according to the address of the virtual controller, the address of each node in the path, and the rank of each node in the path specifically includes: sending a physical service chain identifier obtaining request to the virtual controller according to the address of the virtual controller, where the physical service chain identifier obtaining request carries the address of each node in the path and the rank of each node in the path; and receiving the identifier that is of the physical service chain and that is sent by the virtual controller.

Figure 9:
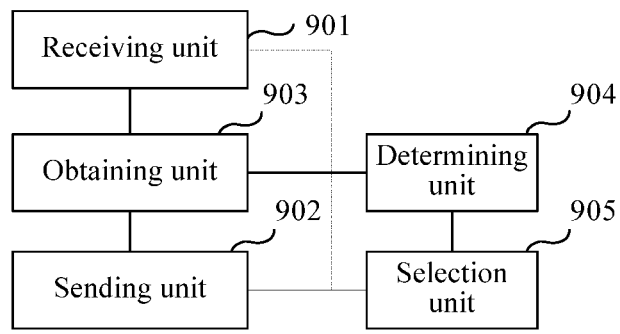
FIG. 9 is a schematic structural diagram of a service control proxy apparatus according to an embodiment of the present disclosure.

FIG. 9 is a simplified functional block diagram of an NFVO in an NFV system. The NFVO is configured to obtain information about a service chain.

The NFVO includes a receiving unit 901, a sending unit 902, an obtaining unit 903, a determining unit 904, and a selection unit 905.

The receiving unit 901 is configured to receive a path instance allocation request message that is sent by a service control proxy apparatus, where the path instance allocation request message carries the path forwarding identifier.

The sending unit 902 is configured to return information about a path instance to the service control proxy apparatus, where the information about the path instance includes an identifier that is of the path instance and that corresponds to the path forwarding identifier, an address of each node in the path, and a rank of each node in the path.

The receiving unit 901 is further configured to receive a request that is for obtaining an address of a virtual controller and that is sent by the service control proxy apparatus, where the request for obtaining an address of a virtual controller carries the identifier of the path instance.

The sending unit 902 is further configured to send the request for obtaining an address of a virtual controller to a virtualized infrastructure manager VIM managing the path instance indicated by the identifier of the path instance.

The receiving unit 901 is further configured to receive an address of a virtual controller that is returned by the VIM.

The sending unit 902 is further configured to send the address of the virtual controller to the service control proxy apparatus, where the address of the virtual controller is used to indicate the virtual controller that provides an identifier of a physical service chain according to the address of each node in the path and the rank of each node in the path.

Optionally, before the receiving unit 901 receives the request that is for obtaining an address of a virtual controller and that is sent by the service control proxy apparatus, the sending unit 902 further returns information about the VIM managing the path instance to the service control proxy apparatus, where the request for obtaining an address of a virtual controller further carries the information about the VIM managing the path instance.

That the sending unit 902 sends the request for obtaining an address of a virtual controller to the VIM managing the path instance specifically includes: sending, according to the information about the VIM managing the path instance, the request for obtaining an address of a virtual controller to the VIM managing the path instance.

Optionally, the NFVO further includes the obtaining unit 903, configured to obtain, according to the identifier of the path instance, information about the VIM managing the selected path instance.

That the sending unit 902 sends the request for obtaining an address of a virtual controller to the VIM managing the path instance specifically includes: sending, according to the information about the VIM managing the path instance, the request for obtaining an address of a virtual controller to the VIM managing the path instance.

Optionally, the receiving unit 901 is further configured to receive a service chain decision device instantiation request, where the service chain decision device instantiation request carries an identifier of a VNF descriptor VNFD of a service chain decision device.

Optionally, the obtaining unit 903 is further configured to obtain the VNFD according to the identifier of the VNFD.

The determining unit 904 is configured to determine, according to the VNFD, that the VNFD includes a requirement for a service control proxy apparatus. The selection unit 905 is configured to select, for the service chain decision device, a VNFM that includes a service control proxy apparatus.

The sending unit 902 is further configured to send the service chain decision device instantiation request to the selected VNFM that includes a service control proxy apparatus.

Optionally, the receiving unit 901 is further configured to receive a service chain decision device instantiation request, where the service chain decision device instantiation request carries an identifier of a VNF descriptor VNFD of a service chain decision device.

The determining unit 904 is configured to determine, according to the VNFD, that the VNFD includes a requirement for a service control proxy apparatus. The selection unit 905 is configured to select, for the service chain decision device, a service control proxy apparatus and a VNFM that does not include a service control proxy apparatus.

The sending unit 902 is further configured to send the service chain decision device instantiation request to the selected VNFM that does not include a service control proxy apparatus, where the service chain decision device instantiation request that is sent to the VNFM further includes an identifier of the selected service control proxy apparatus, and the identifier of the selected service control proxy apparatus is used to instruct the VNFM to configure, after the service chain decision device is instantiated, an address of the service control proxy apparatus for an instance of the service chain decision device according to the identifier of the service control proxy apparatus.

For specific implementations of the operations performed by the units included in the foregoing service control proxy apparatus, refer to the corresponding steps performed by the service control proxy apparatus in the embodiments in FIG. 3 to FIG. 5. Details are not described again. For specific implementations of the operations performed by the units included in the foregoing NFVO, refer to the corresponding steps performed by the NFVO in the embodiments in FIG. 3 to FIG. 5. Details are not described again.

It should be noted that the service control proxy apparatus in FIG. 8 and the NFVO in FIG. 9 are presented in the form of functional units. The term "unit" used in this specification may be, if not limited, an application-specific integrated circuit (ASIC), an electronic circuit, a (shared, dedicated, or combined) processor and memory, or a combinatorial logic circuit that executes one or more software or firmware programs, and/or another suitable component that provides the function.

Persons of ordinary skill in the art should understand that all or some subject matters in this application may be implemented in software combined with hardware and/or firmware. For example, the subject matters described in this specification may be implemented in software executed in one or more processors. In an example implementation, the subject matters described in this specification may be implemented by using a non-transitory computer readable medium that stores a computer executable instruction. When a computer processor executes the computer executable instruction, the instruction controls the computer to perform steps. An example of a computer readable medium suitable for implementing the subject matters described in this specification includes a non-transitory computer readable medium such as a magnetic disk memory device, a chip memory device, a programmable logic device, or an application-specific integrated circuit. In addition, the computer readable medium that implements the subject matters described in this specification may be located on a single device or computing platform, or may be distributed on multiple devices or computing platforms.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A method for obtaining information about a service chain in a cloud computing system, the method comprising:
   receiving, by a service control proxy apparatus, a path forwarding identifier of a path used to transmit service data that is received from a service chain decision device;
   obtaining, by the service control proxy apparatus from a network functions virtualization orchestrator (NFVO), information about a path instance that corresponds to the path forwarding identifier, wherein the information about the path instance comprises an identifier of the path instance, an address of each node in the path, and a rank of each node in the path;
   obtaining, by the service control proxy apparatus from the NFVO, an address of a virtual controller that corresponds to the identifier of the path instance;
   obtaining, by the service control proxy apparatus, an identifier of a physical service chain from the virtual controller according to the address of the virtual controller, the address of each node in the path, and the rank of each node in the path; and
   sending, by the service control proxy apparatus, information about the physical service chain to the service chain decision device for instructing the service chain decision device to route and forward the service data, wherein the information about the physical service chain comprises the identifier of the physical service chain, the address of each node in the path, and the rank of each node in the path.

2. The method according to claim 1, wherein obtaining information about the path instance that corresponds to the path forwarding identifier comprises:
   sending, by the service control proxy apparatus, a path instance allocation request message to the NFVO, wherein the path instance allocation request message carries the path forwarding identifier; and
   receiving, by the service control proxy apparatus, the information about the path instance that is returned by the NFVO.

3. The method according to claim 2, wherein the method further comprises:
   receiving, by the service control proxy apparatus, information about a virtualized infrastructure manager (VIM) managing the path instance that is received from the NFVO; and
   wherein obtaining, by the service control proxy apparatus, the address of the virtual controller that corresponds to the identifier of the path instance comprises:
      sending, by the service control proxy apparatus, a request for obtaining an address of a virtual controller to the NFVO, wherein the request for obtaining the address of the virtual controller carries the identifier of the path instance and the information about the VIM, the information about the VIM for indicating the VIM that provides the address of the virtual controller that corresponds to the identifier of the path instance, and receiving the address of the virtual controller received from the NFVO; or sending, by the service control proxy apparatus, a request for obtaining an address of a virtual controller to the NFVO, wherein the request for obtaining the address of the virtual controller carries the address of each node in the path, the rank of each node in the path, the information about the VIM, the information about the VIM for indicating the VIM that provides the address of the virtual controller that corresponds to the identifier of the path instance, and the identifier of the path instance corresponds to the address of each node in the path and the rank of each node in the path, and receiving the address of the virtual controller received from the NFVO.

4. The method according to claim 2, wherein obtaining the address of the virtual controller that corresponds to the identifier of the path instance comprises:
sending, by the service control proxy apparatus, a request for obtaining an address of a virtual controller to the NFVO, wherein the request for obtaining the address of the virtual controller carries the identifier of the path instance, the request for obtaining an address of a virtual controller for instructing the NFVO to obtain, according to the identifier of the path instance, information about a VIM managing the path instance, and to obtain, from the VIM indicated by the information about the VIM, the address of the virtual controller that corresponds to the identifier of the path instance, and receiving the address of the virtual controller received from the NFVO; or
sending, by the service control proxy apparatus, a request for obtaining an address of a virtual controller to the NFVO, wherein the request for obtaining the address of the virtual controller carries the address of each node in the path and the rank of each node in the path, the request for obtaining an address of a virtual controller for instructing the NFVO to obtain information about a VIM managing the path instance that comprises the address of each node in the path and the rank of each node in the path, and to obtain, from the VIM indicated by the information about the VIM, the address of the virtual controller that corresponds to the identifier of the path instance, and the identifier of the path instance corresponds to the address of each node in the path and the rank of each node in the path, and receiving the address of the virtual controller received from the NFVO.

5. The method according to claim 1, wherein obtaining the identifier of the physical service chain from the virtual controller according to the address of the virtual controller, the address of each node in the path, and the rank of each node in the path comprises:
sending, by the service control proxy apparatus, a physical service chain identifier obtaining request to the virtual controller according to the address of the virtual controller, wherein the physical service chain identifier obtaining request carries the address of each node in the path and the rank of each node in the path; and
receiving, by the service control proxy apparatus, the identifier of the physical service chain that is received from the virtual controller.

6. A method for obtaining information about a service chain in a cloud computing system, the method comprising:
receiving, by a network functions virtualization orchestrator (NFVO), a path instance allocation request message from a service control proxy apparatus, wherein the path instance allocation request message carries a path forwarding identifier;

returning, by the NFVO, information about a path instance to the service control proxy apparatus, wherein the information about the path instance comprises an identifier of the path instance that corresponds to the path forwarding identifier, an address of each node in a path, and a rank of each node in the path;
receiving, by the NFVO, a request for obtaining an address of a virtual controller that is received from the service control proxy apparatus, wherein the request for obtaining an address of a virtual controller carries (i) the identifier of the path instance or (ii) the address of each node in the path and the rank of each node in the path;
sending, by the NFVO, the request for obtaining an address of a virtual controller to a virtualized infrastructure manager (VIM) managing the path instance indicated by the identifier of the path instance;
receiving, by the NFVO, an address of a virtual controller returned by the VIM; and
sending, by the NFVO, the address of the virtual controller to the service control proxy apparatus for indicating the virtual controller that provides an identifier of a physical service chain according to the address of each node in the path and the rank of each node in the path.

7. The method according to claim 6, wherein before receiving the request for obtaining the address of the virtual controller from the service control proxy apparatus, the method comprises:
returning, by the NFVO, information about the VIM managing the path instance to the service control proxy apparatus, wherein the request for obtaining an address of a virtual controller further carries the information about the VIM managing the path instance; and
wherein sending the request for obtaining the address of the virtual controller to the VIM managing the path instance comprises:
sending, by the NFVO according to the information about the VIM managing the path instance, the request for obtaining an address of a virtual controller to the VIM managing the path instance.

8. The method according to claim 6, wherein the method further comprises:
obtaining, by the NFVO according to the identifier of the path instance, information about the VIM managing the selected path instance; and
wherein sending the request for obtaining the address of the virtual controller to the VIM managing the path instance comprises:
sending, by the NFVO according to the information about the VIM managing the path instance, the request for obtaining an address of a virtual controller to the VIM managing the path instance.

9. The method according to claim 6, further comprising:
receiving, by the NFVO, a service chain decision device instantiation request that carries an identifier of a virtualized network function descriptor (VNFD) of a service chain decision device;
obtaining, by the NFVO, the VNFD according to the identifier of the VNFD;
determining, by the NFVO according to the VNFD, the VNFD comprises a requirement for a service control proxy apparatus;
selecting, by the NFVO, for the service chain decision device, a virtualized network function manager (VNFM) that comprises a service control proxy apparatus; and sending, by the NFVO, the service chain decision device instantiation request to the selected VNFM that comprises a service control proxy apparatus.

10. The method according to claim 6, further comprising:
receiving, by the NFVO, a service chain decision device instantiation request, wherein the service chain decision device instantiation request carries an identifier of a virtualized network function descriptor (VNFD) of a service chain decision device;
obtaining, by the NFVO, the VNFD according to the identifier of the VNFD;
determining, by the NFVO, according to the VNFD, the VNFD comprises a requirement for a service control proxy apparatus;
selecting, by the NFVO, for the service chain decision device, a service control proxy apparatus and a virtualized network function manager (VNFM) that does not comprise a service control proxy apparatus; and
sending, by the NFVO, the service chain decision device instantiation request to the selected VNFM that does not comprise a service control proxy apparatus, wherein the service chain decision device instantiation request sent to the VNFM further comprises an identifier of the selected service control proxy apparatus for instructing the VNFM to configure, after the service chain decision device is instantiated, an address of the service control proxy apparatus for an instance of the service chain decision device according to the identifier of the service control proxy apparatus.

11. A network element, comprising:
a transceiver;
a processor coupled to the transceiver; and
a memory coupled to the processor and configured to store computer executable program code comprising instructions which, when executed by the processor, cause the network element to:
receive a path forwarding identifier of a path used to transmit service data that is received from a service chain decision device,
obtain from a network functions virtualization orchestrator (NFVO), information about a path instance that corresponds to the path forwarding identifier, wherein the information about the path instance comprises an identifier of the path instance, an address of each node in the path, and a rank of each node in the path,
obtain from the NFVO, an address of a virtual controller that corresponds to the identifier of the path instance,
obtain an identifier of a physical service chain from the virtual controller according to the address of the virtual controller, the address of each node in the path, and the rank of each node in the path, and
send information about the physical service chain to the service chain decision device for instructing the service chain decision device to route and forward the service data, wherein the information about the physical service chain comprises the identifier of the physical service chain, the address of each node in the path, and the rank of each node in the path.

12. A network element, comprising:
a transceiver;
a processor coupled to the transceiver;
a memory coupled to the processor and configured to store computer executable program code comprising instructions which, when executed by the processor, cause the network element to:
receive a path instance allocation request message received from a service control proxy apparatus, wherein the path instance allocation request message carries the path forwarding identifier,
return information about a path instance to the service control proxy apparatus, wherein the information about the path instance comprises an identifier of the path instance that corresponds to the path forwarding identifier, an address of each node in the path, and a rank of each node in the path,
receive a request for obtaining an address of a virtual controller that is received from the service control proxy apparatus, wherein the request for obtaining an address of a virtual controller carries the identifier of the path instance,
send the request for obtaining an address of a virtual controller to a virtualized infrastructure manager (VIM) managing the path instance indicated by the identifier of the path instance,
receive an address of a virtual controller returned by the VIM, and
send the address of the virtual controller to the service control proxy apparatus for indicating the virtual controller that provides an identifier of a physical service chain according to the address of each node in the path and the rank of each node in the path.

* * * * *